United States Patent [19]

Smith

[11] Patent Number: 5,340,387

[45] Date of Patent: Aug. 23, 1994

[54] COLOR TRANSFORMING ART MEDIUM COMPOSITIONS

[76] Inventor: Donald A. Smith, 1773 14th Ave. S., Seattle, Wash. 98144-4201

[21] Appl. No.: 840,794

[22] Filed: Feb. 24, 1992

[51] Int. Cl.$^5$ .............................................. C09D 11/02
[52] U.S. Cl. ................. 106/20 A; 106/20 B; 106/23 B; 106/21 A
[58] Field of Search ............... 106/19 R, 21 A, 23 B, 106/20 B

[56] References Cited

U.S. PATENT DOCUMENTS

| | | | |
|---|---|---|---|
| 3,360,337 | 12/1967 | Edenbaum et al. | 106/19 R |
| 3,360,338 | 12/1967 | Edenbaum | 106/19 R |
| 3,360,339 | 12/1967 | Edenbaum | 106/19 R |
| 3,627,469 | 12/1971 | Cheng | 106/21 A |
| 3,661,614 | 5/2972 | Bassemir et al. | 117/38 |
| 3,700,603 | 10/1972 | Rembaum | 106/21 A |
| 3,845,662 | 11/1974 | Surgina et al. | 106/21 A |
| 4,155,895 | 5/1979 | Rohowetz et al. | 106/21 A |
| 4,381,198 | 4/1983 | Kondo et al. | 106/112 |
| 4,605,441 | 8/1986 | Masuda et al. | 106/21 A |
| 4,840,670 | 6/1989 | Hughes et al. | 106/19 B |
| 4,859,242 | 8/1989 | Hughes et al. | 106/19 B |
| 4,880,466 | 11/1989 | Zwarun et al. | 106/21 A |

*Primary Examiner*—Helene Klemanski
*Attorney, Agent, or Firm*—Craine & Jackson

[57] ABSTRACT

Color transforming art medium compositions are disclosed herein useful in both the fine and industrial art fields. Spectrally transforming ink and paint compositions comprising one or more spectral elements mixed in a 3% to 50% ratio by volume with a pigmented ink or paint art vehicle. The spectral elements comprising various types of ceramic colorant agents. The art medium composition produced is then applied to the surface of a suitable substrate, such as metal, glass or paper. The substrate and composition is then heated or fired at a relatively high temperature during which the substrate and ink or paint composition undergo partial or complete oxidation.

2 Claims, No Drawings

COLOR TRANSFORMING ART MEDIUM COMPOSITIONS

TECHNICAL FIELD

This invention relates to art medium compositions and, more particularly, to ink or paint art mediums compositions that undergo color transformation when heated to relatively high temperatures.

BACKGROUND ART

It is common knowledge that traditional ink or paint art medium compositions used today are unable to withstand relatively high temperatures. Generally, any image or text created on the surface of the ground material using these mediums is destroyed or lost when exposed to these temperatures.

In various fields, it is sometimes desirable to use ink or paint mediums that can undergo color transformation when exposed to relatively high temperatures. For example, artists in the commercial or fine art fields could use such mediums to create new works of art which could not be created with conventional ink and paint mediums.

In various industrial fields, color transforming inks and paints could be used on the surfaces of objects which when heated beyond safe temperatures, would undergo color transformation and act as an indicator. In the work place, for example, heat sensitive equipment or machinery could be painted with color transforming paints which would undergo color transformation when their surfaces became too hot. Another example of use in the work place would be pipes used to transfer water and gases in nuclear power plants could be painted with color transforming paints that which undergo color transformation when the pipe surface became too hot. Such mediums could also be useful in homes where exposed sections of flue pipe used with wood stoves or furnaces could be painted with color transforming paints that would change color if the sections became too hot.

Since ancient times, it has been known in the pottery industry to add powdered ceramic coloring agents to glazes to produce color and decorative designs on pottery ware. Such coloring agents were generally powdered metallic oxides and other compounds. When mixed with glaze material, applied to the clay body, and exposed to relatively high temperatures, the coloring agents would undergo color transformation to produce new colors.

Most ceramic coloring agents used today contain flux and other ingredients which promote fusion or vitrification of the glaze material. In some instances, however, other substances have been added for special applications. For example, metallic flake-like materials are often added to enamel or acrylic paints to provide a metallic finish to the surface. Kondo, et al., U.S. Pat. No. 4,381,198, discloses ink mediums containing ceramic materials used for manufacturing low resistant conductors using two to four metallic ingredients.

Bassemir, et al., U.S. Pat. No. 3,661,614, discloses a radiation curable solvent-free printing ink containing a radiation polymerizable compound, a photo-initiator, and a colorant, that dries almost simultaneously in air, exhibits minimal color change under normal conditions, and can be used on glass and other types of materials used for food containers.

None of the ink or paint mediums known in the prior art are capable of undergoing color transformation at relatively high temperatures as the ink and paint mediums disclosed herein.

DISCLOSURE OF THE INVENTION

The invention disclosed herein will be described in the context of the fine art field. As will be appreciated by those skilled in the other fields, this invention will likely have application in other arts fields and in other industries where color transforming mediums may be useful.

It is a general object of the invention to provide a novel art medium composition that is capable of undergoing color transformation when exposed to relatively high temperatures.

It is a general object of the invention to provide such an art medium composition that can be easily manufactured by an artist using traditional, commercially available ingredients.

It is an object of the invention to provide such an art medium composition that may be applied to various substrate surfaces in the same manner as other traditional art mediums.

It is another object of the invention to provide a method of creating art work using a color transforming art medium composition.

The foregoing objects and other objects apparent to those skilled in the art are accomplished with this invention by providing a color transforming art medium composition comprising an ink or paint vehicle containing one or more types of spectral elements dissolved or suspended therein. The resulting composition can be applied and used in a traditional manner to various substrate surfaces. The treated surface is then heated or fired at relatively high temperatures to undergo color transformation.

The ink or paint vehicles used are made of traditional ingredients, such as pigments or dyes, solvents, binders, and stabilizers. At high temperatures, such ingredients are normally destroyed. The spectral elements, which are dissolved or suspended in the ink or paint vehicle before applying the composition to the substrate surface, are oxidized at high temperatures to produce a new color. Since in most compositions, the new color is different from the mediums original color, the medium appears to undergo color transformation during the firing or heating process.

The ink or paint vehicles disclosed herein must be capable of dissolving or suspending spectral elements. The spectral elements are metallic oxides that dissolved or suspended in the ink or paint vehicle in a 3:97 to 50:50 ratio, (spectral element: vehicle). With each vehicle, the amount of spectral element added may be adjusted so that a desirable initial color and consistency in the medium is achieved.

After the art medium composition has been prepared, it is then applied to a suitable substrate surface. The type of substrate that may be used may be paper, metal, plastic, wood, stone, glass, leather, plaster, and fabrics, such as cotton, canvas, or man-made materials such as polyester. The actual type of substrate used in a given situation depends upon factors, such as: the purpose or artistic quality of the work of art; the type of firing or heating process used; and the amount of stability required in the finished product. Each substrate used has unique heat-tolerating properties, which can affect over artistic quality of the work of art.

After the art medium composition is manufactured, the composition is applied to the substrate surface using any desirable conventional method, such as brush, spray, palette or submersion. After application to the substrate surface, the substrate is then heated or fired at a relatively high temperatures, (450 degrees F. or greater). During the heating or firing, the ink or paint vehicle component in the composition is destroyed or evaporated while the spectral elements are partially or completely oxidized to produce the final color. It should be appreciated that during the heating or firing process, the substrate material itself may be heat-sensitive and therefore, may be partially or completely destroyed. The actual method used to heat or fire the substrate surface may also be used to create new designs and effects on the work of art.

Any conventional heating or firing method may be used in the process. The actual method used will depend upon the composition used, the substrate, and the artistic quality desired.

After the heating or firing process has taken place, it may be desirable to "fix" or stabilize the substrate surface with a fixing substance, such as an acrylic spray. The fixing substance acts to secure and hold the oxidized art medium composition and substrate surface together so it can be transported or further manipulated.

BEST MODE FOR CARRYING OUT THE INVENTION

In accordance with the present invention, there is provided a color transforming art medium composition comprising an ink or paint vehicle and spectral elements dissolved or suspended therein. When applied to a suitable substrate surface and heated or fired at relatively high temperatures, the ink or paint vehicle is partially or completely destroyed while the spectral elements are completely or partially oxidized. During the process, the spectral elements undergo partial or complete oxidation to create new distinct colors on the substrate surface.

In one embodiment of the composition, an oil-based ink vehicle is used, such as a lithographic ink. In other types of ink vehicle-containing compositions, other types of ink vehicles, such as the Japanese inks, Chinese inks, or drawing inks, may also be used. In another embodiment of the composition, a water-based paint vehicle, such as an acrylic paint, is used. Other types of paint vehicle containing-compositions, such as tempera or enamels, may be used instead.

Before using the art medium composition, the artist must choose the proper vehicle and substrate to produce the desired piece of art work. One consideration must be whether the manufactured art medium composition can be transferred and applied to the substrate surface in the manner desired, (e.g. brushed, sprayed, silk-screened, etc). Another consideration is what impact the heating or firing process will have on the artistic and physical characteristics of the art work. Because litho-based inks and acrylic paints achieve better results than other types of ink and paint vehicles, they are preferred over other types of ink and paint vehicles.

Most art vehicles used in the invention contain pigments or dyes which gives the vehicle its initial color. After the spectral elements have been mixed with the art vehicle, an intermediate color is produced. For example when the spectral elements are white or pale yellow, the intermediate color is usually slightly lighter than the initial color of the art vehicle. If the artist wants the intermediate color to be different or substantially identical to the initial color of the art vehicle, suitable pigments must be added to the vehicle or composition, or a different spectral element must be used.

In most applications, the artist will want to manufacture compositions that undergo dramatic color transformations on the substrate surface. In some situations, however, the artist may want very little color transformation. Besides using spectral elements which produce only slight color transformation, the artist can partially heat or fire the substrate surface so that the pigment or dye in the vehicle is only partially destroyed and only a portion of the spectral elements are oxidized. This produces unique blends of colors on the substrate surface. In some embodiments, phthalocyanine blue (pigment blue 15) and lamp black (pigment black 6 and 7) are used in a lithographic ink vehicle. In another embodiment, quinacridone magenta (pigment violet 19) is mixed in the paint vehicle. In still another embodiment, phthalocyanine blue (pigment blue 15) is used in an acrylic paint vehicle. With each vehicle, it is believed that all of the following pigments or dyes would provide satisfactory results: mars black (pigment black 11), ivory black, (pigment black 9), prussian blue (pigment blue 27), cobalt blue (pigment blue number 28), ultramarine blue (pigment blue 29), manganese blue (pigment blue 33), cerulean blue, (pigment blue 35), indanthrone blue (pigment blue 60), chromium oxide (pigment green 17), viridian (pigment green 18), cobalt green (pigment green 19), terre verte (pigment green 23), nickel azo yellow (pigment green 10), light green oxide (pigment green 50), phthalocyanine green-chlorinated copper phthocyanine (pigment green 7), burnt sienna (pigment brown 7), perinone orange (pigment orange 43), irgazin orange (pigment orange 66), quinacridone magenta (pigment violet 19), cobalt violet (pigment violet 14), ultramarine violet (pigment violet 15), manganese violet (pigment violet 16), dioxazine violet (pigment violet 23), zinc white (pigment white 4), titanium white (pigment white 6), flake white (pigment white 1), aluminum hydrate (pigment white 24), blanc fixe (pigment white 21), china clay (pigment white 18), lithophone (pigment white 5), arylide yellow G (pigment yellow 1), arylide yellow 10G (pigment yellow 3), barium chromate (pigment yellow 31), chrome yellow (pigment yellow 34), chrome lemon (pigment yellow 34), zinc yellow (pigment yellow 36), cadmium yellow (pigment yellow 37), aureolin (pigment yellow 40), naples yellow (pigment yellow 41), nickel titanate (pigment yellow 53), arylide yellow GX (pigment yellow 73), isoindolinone yellow, (pigment yellow 109/110), flavanthrone yellow, (pigment yellow 112), yellow ochre (pigment yellow 43), chromophytal yellow 8GN (pigment yellow 128), toluidine red (pigment red 3), quinacridone red (pigment violet 19), permanent crimson (pigment red 7), rose madder (pigment red 9), alizarin crimson (pigment red 83), vermillion (pigment red 106), cadmium red (pigment red 108), permanent red ERG (pigment red 112), brominated anthranthrone (pigment red 168), naphthol carbamide (pigment red 177), perylene red (pigment red 190), quinacridone red (pigment red 207/209), chromophthal red BRN (pigment red 144), chromophthal scarlet R (pigment red 166).

The spectral elements are mixed with the ink or paint vehicles from 3:97 up to 50:50 ratio by volume. The spectral elements are ceramic colorants commonly used in the pottery industry. In the preferred embodiments, these ceramic colorant are iron oxide and antimony. It is believed, however, that all of the ceramic colorants used today in the pottery industry could be used in the invention, they include: aluminum oxide, barium oxide, bismuth oxide, boric oxide, cadmium oxide, calcium oxide, cerium oxide, chromium oxide, cobalt oxide, copper oxide, iridium oxide, lead oxide, magnesium oxide, manganese oxide, nickel oxide, phosphorus oxide, potassium oxide, rutile, silicon oxide, silver oxide, sodium oxide, strontium oxide, tin oxide, titanium dioxide, titanium oxide, vanadium oxide, zinc oxide, and zirconium oxide. To provide unique colors or color blends, multiple spectral elements could be mixed together in the ink or paint vehicles.

Various types of substrates may be used with the invention. Depending upon the artistic effect desired, the substrate material used may or may not be able to withstand the intense heat generated during the firing or heating process. Also, depending upon the artistic effect desired by the artist, the pre-firing and post-firing texture of the substrate material may also be a factor that the artist may consider. In most instances, the artist will choose the substrate material based on whether the surface of substrate can physically withstand the high temperatures. Generally, metallic or glass substrate surfaces tolerate higher heating or firing temperatures than paper or wood surfaces.

During the heating or firing process, the substrate material may actually combust or disintegrate. When using these type of substrates, additional steps must be taken to hold the substrate and oxidize composition together. A fixing agent, such as an acrylic spray, may be applied to the substrate surface after heating or firing the surface to hold it together. With some substrate surfaces, the heating or firing process destroys the surface or makes it so unstable that such a fixing agent can not be applied to the surface. In these situations, a photograph must be taken of the work of art to preserve it.

PROCEDURE

The first step in preparing the art medium composition is the selection of a suitable art vehicle. In most instances, the type of art vehicle used depends upon the nature of the work, the heat or firing characteristics of the art vehicle, and results desired by the artist. Since the art vehicle usually contain dyes or pigments, the initial color of the art vehicle may be important factor. Although different companies manufacture different brands of ink or paint vehicles, no single brand appears to give superior results over the other brands.

When making the art medium composition, one part equals 1 teaspoonful. Using a large cup and a teaspoonful measuring device, 8 parts of the art vehicle are placed into the cup. ¼ to 8 parts of a ceramic colorant are then added to the cup and mixed vigorously with the art vehicle. As the ratio of ceramic colorant to art vehicle increases, the art vehicle becomes paste-like and the overall color of the art medium composition approaches the color of the ceramic colorant. If the quality of the composition is too paste-like and undesirable, a suitable solvent compatible with the art vehicle may be added to the composition. If the mixture's color is undesirable, the ratio of ceramic colorant may be altered or a suitable dye or pigment may be added to the art medium composition.

After the art medium composition has been prepared, it is then applied to the surface of a suitable substrate. The actual method for applying the art medium to the substrate depends upon the nature of the art medium and the artistic effect that the artist is trying to create. In some situations, the art medium composition may be applied with a brush or palette while in other situations it may be applied by sprayer or silk-screening apparatus. In addition, two or more coats of the art medium composition may be applied over the substrate surface. This results in more ceramic colorants being deposited on the substrate surface which increases the intensity of the final color generated during the heating or firing process.

After the art medium composition has been applied to the substrate surface, it is then heated or fired at a relatively high temperature. The actual method of heating or firing, the maximum temperature obtained during the heating or firing process, and the degree or extent of heating or firing, are variables which can be adjusted by the artist to obtain different artistic effect desired. For example with paper stock substrate material, it is known that combustion occurs at approximately 450 degrees F. Therefore, if combustion of the paper substrate material is not desirable, a suitable method of firing below 450 degrees F. must be used. If only a portion of the substrate material is to be destroyed during the heating or firing process, then the artist must control the rate and length of heating or firing.

In most applications, an oven or a propane torch is used in the heating or firing process. A propane torch has shown to be especially useful since the flame size, rate, and direction of exposure can be easily controlled by the artist.

After the heating or firing process is completed, the substrate surface may be unstable. Therefore, a fixing agent, such as an clear acrylic spray, may be used to fix or stabilize the substrate surface.

EXAMPLE 1

A medium composition A according to the present invention comprises 3 parts iron oxide ceramic colorant, mixed together with 4 parts of phthalocynanide blue lithograph ink (pigment blue 15) manufactured by GOLDEN ARTISTS COLORS, INC., New Berlin N.Y. The iron oxide, is a red powder and mixed vigorously with the litho ink by hand for approximately two to five minutes until a good paste-like consistency is achieved. A thin blade, flexible palate knife is recommended for mixing because it allows one to fold the iron oxide powder into the vehicle. When mixing is complete, the medium composition A is dark blue.

Next, medium composition A is applied to 100 pound card stock measuring approximately 5 inches $\times 8$ inches. The medium composition A is applied to the card stock with a palette knife to create a relatively thick layer of medium composition A over the substrate surface. When the application process is completed, the card is then burned completely under a propane torch which produces a flame temperature of approximately 451 degrees Fahrenheit. One corner of the card was exposed to the flame which continued to burn across the card for approximately 18 to 20 seconds. During the burning process, the pigments in the art vehicle are destroyed and the iron oxide is partially and completely oxidized to create the orange color image as shown. Also, during the burning process, the bubbles formed in thick composition causing sections of the medium composition A to crumble and fall away. During the burning process the stock card is turned to ash and becomes too unstable for transport.

EXAMPLE 2

Medium composition B according to the present invention comprises 1 part iron oxide ceramic colorant, mixed together with 3 parts Cadmium Orange acrylic paint (chemically pure Cadmium Sulfoselenide) manufactured by DAN SMITH, INC., of Seattle, Washington. The colorant and paint are vigorously mixed together for 3 to 4 minutes. The resulting medium composition B, which is orange is then applied to a 5 inch × 8 inch 100 lbs. card stock white paper with a palette knife.

After applying the medium composition B to the card, the card is then ignited using a propane blow torch. The blow torch is used until the card is completely destroyed. During the process, the medium composition B is partially oxidized. The outer edges of the medium composition B, which is exposed to greater heat undergoes color transformation from orange to light green. The central portion of the medium composition B does not undergo color transformation and remains orange. During the heating or firing process, the blow torch may be swept back and forth across the substrate surface so that different areas of the medium composition B are oxidized.

EXAMPLE 3

Medium composition C according to the present invention comprises 6 parts titanium white acrylic paint, 1 and ¼ parts yellow ochre acrylic paint (Iron Oxide, PY-43/CI# 77492), and 1 part antimony, 2 parts copper carbonate ceramic colorants mixed together with 1 part water. The ceramic colorants are mixed vigorously to the paint vehicle until an acceptable consistency is achieved. The final color of medium composition C is beige.

After manufacturing medium composition C, it is then applied to a thin sheet of copper metal approximately 0.003 in thick and measuring approximately 10×16 inches. A propane blow torch is used to apply direct flame to the substrate surface to obtain relatively a high temperature. During the heating or firing process, the blow torch is swept back and forth across the substrate surface to expose portions of the medium composition C to the flame. By sweeping the flame across the surface in this manner, a series of heating and cooling patterns are created on the substrate and composition C surface which creates distinct color lines. Also during the heating process, the copper surface is discolored but not destroyed.

EXAMPLE 4

The art medium composition C described above is now applied to a different substrate to demonstrate how the substrate can change the artistic work. Art medium composition C is first applied by a palette knife to a 100 lbs. card white stock measuring approximately 5 inches × 8 inches. The heating or firing process is carried out by burning one edge of the card using a propane torch. A flame is use to ignite one corner of the card which burns completely across the card surface in approximately 15 to 17 seconds. When the burning process is completed, the medium composition C undergoes color transformation from beige to ivory white.

In compliance with the statute, the invention has been described in language more or less specific as to composition of the art medium. It is understood, however, that the invention is not limited to the specific features shown since the means and construction herein disclosed comprise a preferred form of putting the invention into practice. The invention is, therefore, claimed in any of its forms or modifications within the legitimate and valid scope of the appended claims, appropriately interpreted in accordance with the doctrine of equivalents.

I claim:
1. An art medium composition, comprising:
   a. a lithographic ink vehicle, said lithographic ink vehicle containing at least one pigment from the following group consisting of phthalocyanine blue (pigment blue 15); lamp black (pigment black 6 and 7); quinacridone magenta (pigment violet 19); mars black (pigment black 11); ivory black, (pigment black 9); prussian blue (pigment blue 27); cobalt blue (pigment blue number 28); ultramarine blue (pigment blue 29); manganese blue (pigment blue 33); cerulean blue (pigment blue 35); indanthrone blue (pigment blue 60); chromium oxide (pigment green 17); viridian (pigment green 18); cobalt green (pigment green 19); terre verte (pigment green 23); nickel azo yellow (pigment green 10); light green oxide (pigment green 50); phthalocyanine green-chlorinated copper phthocyanine (pigment green 7); burnt sienna (pigment brown 7); perinone orange (pigment orange 43); irgazin orange (pigment orange 66); quinacridone magenta (pigment violet 19); cobalt violet (pigment violet 14); ultramarine violet (pigment violet 15); manganese violet (pigment violet 16); dioxazine violet (pigment violet 23); zinc white (pigment white 4); titanium white (pigment white 6); flake white (pigment white 1); aluminum hydrate (pigment white 24); blanc fixe (pigment white 21); china clay (pigment white 18); lithophone (pigment white 5); arylide yellow G (pigment yellow 1); arylide yellow 10G (pigment yellow 3); barium chromate (pigment yellow 31); chrome yellow (pigment yellow 34); chrome lemon (pigment yellow 34); zinc yellow (pigment yellow 36); cadmium yellow (pigment yellow 37); aureolin (pigment yellow 40); naples yellow (pigment yellow 41); nickel titanate (pigment yellow 53); arylide yellow GX (pigment yellow 73); isoindolinone yellow, (pigment yellow 109/110); flavanthrone yellow, (pigment yellow 112); yellow ochre (pigment yellow 43); chromophytal yellow 8GN (pigment yellow 128); toluidine red (pigment red 3); quinacridone red (pigment violet 19); permanent crimson (pigment red 7); rose madder (pigment red 9); alizarin crimson (pigment red 83); vermillion (pigment red 106); cadmium red (pigment red 108); permanent red FRG (pigment red 112); brominated anthranthrone (pigment red 168); naphthol carbamide (pigment red 177); perylene red (pigment red 190); quinacridone red (pigment red 207/209); chromophthal red BRN (pigment red 144); and chromophthal scarlet R (pigment red 166), and;
   b. one or more spectral elements selected from the group consisting of aluminum oxide, barium oxide, bismuth oxide, boric oxide, cadmium oxide, calcium oxide, cerium oxide, chromium oxide, cobalt oxide, copper oxide, iridium oxide, lead oxide, magnesium oxide, managanese oxide, nickel oxide, phosphorus oxide, potassium oxide, rutile, silicon oxide, silver oxide, sodium oxide, strontium oxide, tin oxide, titanium dioxide, titanium oxide, vanadium oxide, zinc oxide and zirconium oxide being mixed with said lithographic ink vehicle in a 3:97 to 50:50 ratio by volume, said spectral elements being capable of being oxidized with heat to produce a second color.

2. An art medium composition, comprising:
a. an acrylic paint vehicle, said acrylic paint vehicle containing at least one pigment from the following group consisting of phthalocyanine blue (pigment blue 15), lamp black (pigment black 6 and 7); quinacridone magenta (pigment violet 19); mars black (pigment black 11); ivory black, (pigment black 9); prussian blue (pigment blue 27); cobalt blue (pigment blue number 28); ultramarine blue (pigment blue 29); manganese blue (pigment blue 33); cerulean blue (pigment blue 35); indanthrone blue (pigment blue 60); chromium oxide (pigment green 17); viridian (pigment green 18); cobalt green (pigment green 19); terre verte (pigment green 23); nickel azo yellow (pigment green 10); light green oxide (pigment green 50); phthalocyanine green-chlorinated copper phthocyanine (pigment green 7); burnt sienna (pigment brown 7); perinone orange (pigment orange 43); irgazin orange (pigment orange 66); quinacridone magenta (pigment violet 19); cobalt violet (pigment violet 14); ultramarine violet (pigment violet 15); manganese violet (pigment violet 16); dioxazine violet (pigment violet 23); zinc white (pigment white 4); titanium white (pigment white 6); flake white (pigment white 1); aluminum hydrate (pigment white 24); blanc fixe (pigment white 21); china clay (pigment white 18); lithophone (pigment white 5); arylide yellow G (pigment yellow 1); arylide yellow 10G (pigment yellow 3); barium chromate (pigment yellow 31); chrome yellow (pigment yellow 34); chrome lemon (pigment yellow 34); zinc yellow (pigment yellow 36); cadmium yellow (pigment yellow 37); aureolin (pigment yellow 40); naples yellow (pigment yellow 41); nickel titanate (pigment yellow 53); arylide yellow GX (pigment yellow 73); isoindolinone yellow, (pigment yellow 109/110); flavanthrone yellow, (pigment yellow 112); yellow ochre (pigment yellow 43); chromophytal yellow 8GN (pigment yellow 128); toluidine red (pigment red 3); quinacridone red (pigment violet 19); permanent crimson (pigment red 7); rose madder (pigment red 9); alizarin crimson (pigment red 83); vermillion (pigment red 106); cadmium red (pigment red 108); permanent red FRG (pigment red 112); brominated anthranthrone (pigment red 168); naphthol carbamide (pigment red 177); perylene red (pigment red 190); quinacridone red (pigment red 207/209); chromophthal red BRN (pigment red 144); and chromophthal scarlet R (pigment red 166), and;
b. one or more spectral elements selected from the group consisting of aluminum oxide, barium oxide, bismuth oxide, boric oxide, cadmium oxide, calcium oxide, cerium oxide, chromium oxide, cobalt oxide, copper oxide, iridium oxide, lead oxide, magnesium oxide, manganese oxide, nickel oxide, phosphorous oxide, potassium oxide, rutile, silicon oxide, silver oxide, sodium oxide, strontium oxide, tin oxide, titanium dioxide, titanium oxide, vanadium oxide, zinc oxide and zirconium oxide being mixed with said acrylic paint vehicle in a 3:97 to 50:50 ratio by volume, said spectral elements being capable of being oxidized with heat to produce a second color.

* * * * *